(12) United States Patent
Garrett et al.

(10) Patent No.: US 10,718,196 B2
(45) Date of Patent: Jul. 21, 2020

(54) RESTRICTIVE FLOW AREA SECTION IN AN INTAKE PASSAGE OF A WELL PUMP

(71) Applicant: Baker Hughes, A GE Company, LLC, Houston, TX (US)

(72) Inventors: David Garrett, Bartlesville, OK (US); Shawn Gunter, Owasso, OK (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 252 days.

(21) Appl. No.: 15/945,905

(22) Filed: Apr. 5, 2018

(65) Prior Publication Data

US 2018/0291721 A1 Oct. 11, 2018

Related U.S. Application Data

(60) Provisional application No. 62/482,511, filed on Apr. 6, 2017.

(51) Int. Cl.

| F04B 47/06 | (2006.01) |
|---|---|
| E21B 43/38 | (2006.01) |
| B01D 19/00 | (2006.01) |
| E21B 43/12 | (2006.01) |
| F04B 17/04 | (2006.01) |
| F04B 17/03 | (2006.01) |
| F04B 19/22 | (2006.01) |

(52) U.S. Cl.
CPC .......... *E21B 43/38* (2013.01); *B01D 19/0042* (2013.01); *E21B 43/128* (2013.01); *F04B 17/03* (2013.01); *F04B 17/04* (2013.01); *F04B 47/06* (2013.01); *F04B 19/22* (2013.01)

(58) Field of Classification Search
CPC ...... B01D 19/0042; F04B 47/06; E21B 43/38
See application file for complete search history.

(56) References Cited

U.S. PATENT DOCUMENTS

| 2,179,480 | A | * | 11/1939 | Coberly | ................. E21B 43/38 |
|---|---|---|---|---|---|
| | | | | | 166/105.5 |
| 5,707,214 | A | | 1/1998 | Schmidt | |
| 2010/0212908 | A1 | | 8/2010 | Stokka et al. | |
| 2013/0068455 | A1 | | 3/2013 | Brown et al. | |
| 2015/0053394 | A1 | | 2/2015 | Reid et al. | |
| 2015/0176574 | A1 | | 6/2015 | Dearman et al. | |
| 2016/0369788 | A1 | | 12/2016 | Brown et al. | |

OTHER PUBLICATIONS

International Search Report and Written Opinion dated Jul. 11, 2018 for corresponding PCT/US2018/026224.

* cited by examiner

*Primary Examiner* — Robert A Hopkins
(74) *Attorney, Agent, or Firm* — Bracewell LLP; James E. Bradley

(57) ABSTRACT

A well pump assembly has a pump housing with an intake member. A barrel has a barrel head secured to and extending downward from the intake member. A plunger is reciprocally carried in the barrel bore. An intake passage extends coaxially in the intake member and the barrel head into the barrel bore above the plunger. An intake port extends from an exterior of the intake member to the intake passage. A nozzle is secured within in the intake passage. The nozzle has an orifice passage with a downward converging section extending downward to a constant diameter section. The constant diameter section has a smaller diameter than the intake passage.

15 Claims, 3 Drawing Sheets

RESTRICTIVE FLOW AREA SECTION IN AN INTAKE PASSAGE OF A WELL PUMP

CROSS REFERENCE TO RELATED APPLICATION

This application claims priority to provisional application Ser. No. 62/482,511, filed Apr. 6, 2017.

FIELD OF DISCLOSURE

The present disclosure relates to well pumps. More specifically, the present disclosure relates to a reciprocating pump having an orifice with a restrictive flow area within an intake passage for separating gas.

BACKGROUND

Submersible pumping systems are often used in hydrocarbon producing wells for pumping fluids from within the wellbore to the surface. These fluids are generally liquids made up of produced liquid hydrocarbon and often water. One type of system used in this application employs an electrical submersible pump ("ESP") system. ESP systems include a pump operated by an electrically powered motor for pressurizing the fluid. Pressurized fluid is discharged from the pump and into production tubing, or by other means, for conveyance to surface.

The types of ESP systems in wellbores generally include centrifugal pumps, progressive cavity pumps, reciprocating pumps, and positive displacement pumps. Centrifugal and progressive cavity pumps are usually equipped with a rotating impeller or helical rotor to urge the fluid from downhole to the surface. The reciprocating pumps and positive displacement pumps typically operate by reciprocating a plunger to force wellbore liquid up hole. In any of these designs, vapor lock can occur within the pump when a sufficient amount of gas accompanies the liquid, so that forces applied to the liquid merely compress the gas rather than causing the fluid to be lifted to surface.

SUMMARY

A well pump assembly has a pump housing having a longitudinal axis. An intake member is secured to the pump housing. A discharge member with a discharge passage is secured to the pump housing. An intake passage in the intake member draws well fluid into the pump. A fluid moving mechanism is operatively located between the intake passage and the discharge passage to propel the well fluid out the discharge passage. An orifice in the intake passage has an orifice passage with a downstream direction converging section extending from the intake passage to a constant diameter section. The constant diameter section has a smaller diameter than the intake passage.

In one embodiment, the orifice comprises a nozzle containing the orifice passage and secured within the intake passage. In this embodiment, the nozzle is secured within a downstream end of the intake passage. The converging section of the orifice passage has an upstream end with a diameter equal to a diameter of the downstream end of the intake passage.

Also, in this embodiment, the orifice includes an annular upstream facing shoulder at a downstream end of the intake passage. An orifice bore extends through the upstream facing shoulder. The nozzle has a nozzle upstream portion and a nozzle downstream portion. The nozzle upstream portion has a larger outer diameter than an outer diameter of the nozzle downstream portion, defining a downstream facing shoulder that rests on the upstream facing shoulder. The outer diameter of the nozzle upstream portion may be the same as the diameter of the intake passage. The outer diameter of the nozzle downstream portion may be the same as the diameter of the orifice bore.

In a second embodiment, the nozzle is not employed in the orifice. The orifice has a downstream direction diverging section that joins and extends downward from the constant diameter section of the orifice passage.

Figure 1A:
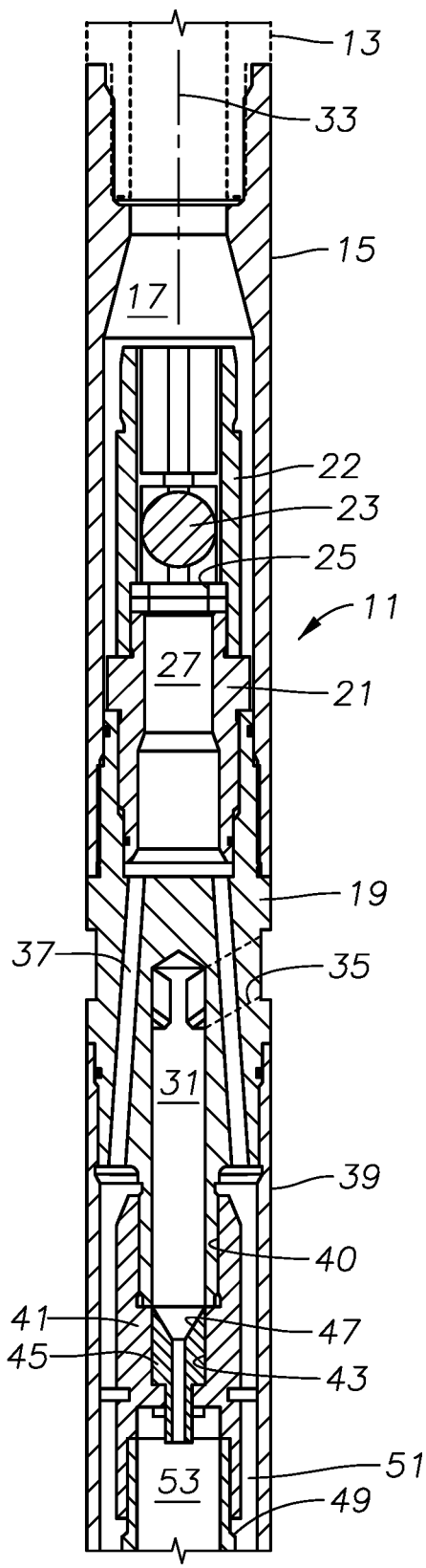
FIGS. 1A and 1B comprise a sectional view of a reciprocating pump having a nozzle inlet passage in accordance with this disclosure.

While the disclosure will be described in connection with two embodiments, it will be understood that it is not intended to limit the disclosure to these embodiments. On the contrary, it is intended to cover all alternatives, modifications, and equivalents, as may be included within the scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1A, pump 11 attaches to a string of production tubing 13 that supports pump 11 in a well. Pump 11 has a discharge head 15 with a discharge passage 17 that discharges well fluid into production tubing 13. In this example, a tubular intake member 19 secures by threads to the lower end of discharge head 15. A standing valve 21 has a lower end secured by threads to the upper end of intake member 19. Standing valve 21 includes a cage 22 containing a ball or valve element 23. Ball 23 has a closed position against a seat 25 below ball 23 in cage 22; in the open position, ball 23 moves above seat 25. Seat 25 is at the upper end of a valve passage 27 extending through standing valve 21.

Intake member 19 has an intake passage or cavity 31 that is a constant diameter cylindrical passage concentric with pump axis 33. Intake ports 35 (one shown by dotted lines) extend to intake cavity 31 from the exterior of intake member 19. Intake cavity 31 has a closed upper end just above the junction where intake ports 35 join intake cavity 31. Discharge passages 37 extend upward from the lower end of intake member 19 to valve passage 27. Discharge passages 37 are spaced around intake cavity 31 and do not connect with intake ports 35 or intake cavity 31.

Figure 2:
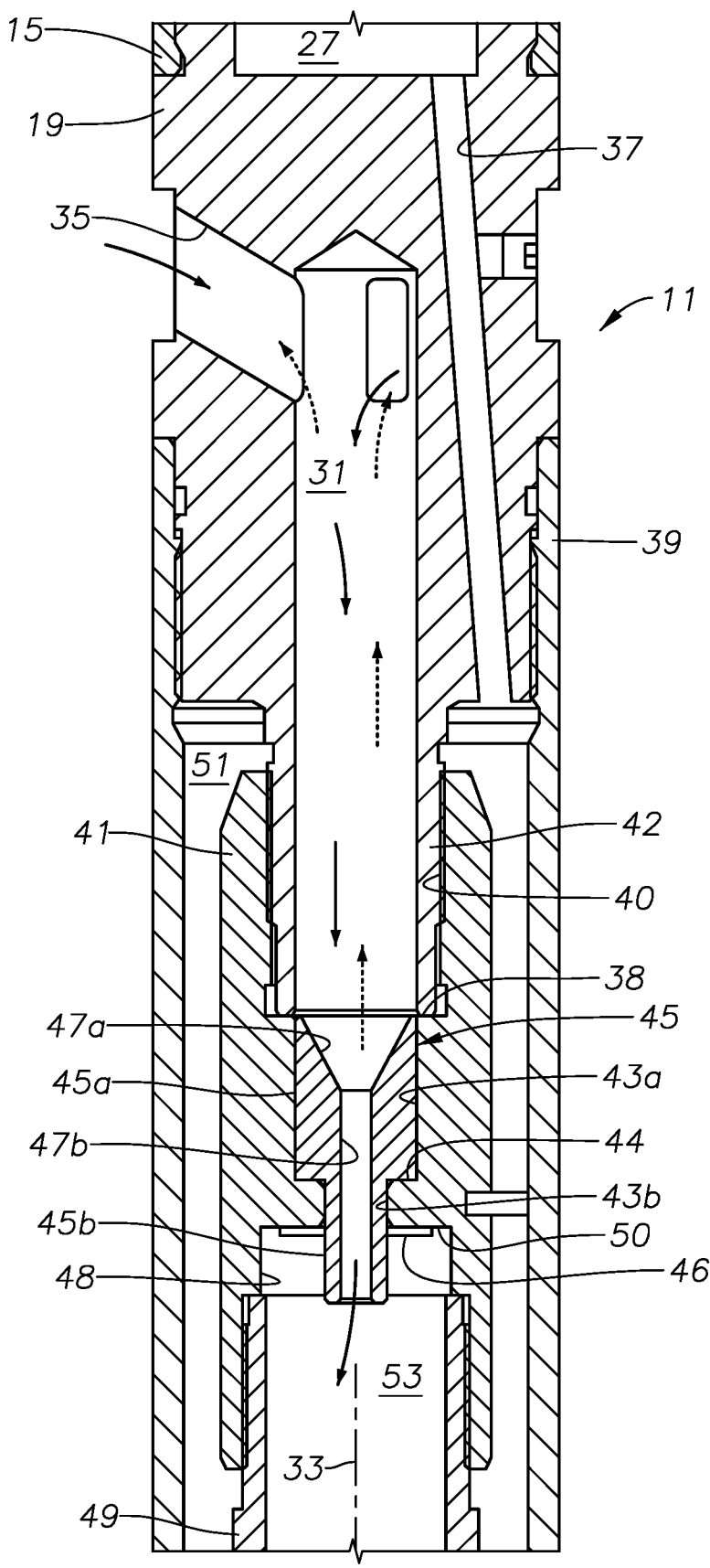
FIG. 2 is an enlarged sectional view of a portion of the pump of FIGS. 1A and 1B.

Pump 11 has a cylindrical housing 39 that secures by threads to intake member 19 and extends downward. Housing 39 encloses a barrel head 41 that has an internally threaded receptacle 40 on its upper end. Referring to FIG. 2, a depending neck 42 of intake member 19 inserts into receptacle 40 and secures to the internal threads. Barrel head 41 has an orifice bore 43 extending coaxially downward from the lower end of barrel head receptacle 40.

Orifice bore 43 has an upper portion 43a and a lower portion 43b, which extends downward from upper portion 43a. In this example, orifice bore upper portion 43a has a smaller diameter than barrel head receptacle 40, defining an upward facing shoulder 38 on which the lower end of intake member neck 42 abuts. Orifice bore upper portion 43a has the same diameter as the diameter of intake cavity 31. Orifice bore upper portion 43a has a larger diameter than orifice bore lower portion 43b, defining an upward facing shoulder 44.

Barrel head 41 has a lower bore portion 48 extending downward from orifice bore lower portion 43b. Lower bore portion 48 has a larger diameter than orifice bore lower portion 43b, defining an annular downward facing shoulder 50.

In this embodiment, the orifice at the lower end of intake cavity 31 includes a nozzle 45 that fits within orifice bore portions 43a and 43b. Nozzle 45 has an upper portion 45a with an outer diameter that fits closely within orifice bore portion 43a. A seal (not shown) or an interference fit optionally may seal the outer diameter of nozzle upper portion 45a to orifice bore upper portion 43a. Nozzle 45 has a depending lower portion or neck 45b with an outer diameter that extends closely through and below orifice bore lower portion 43b. The difference between the outer diameters of nozzle upper portion 45a and nozzle lower portion 45b defines a downward facing annular surface that abuts upward facing shoulder 44. A nut 46 may secure to threads on neck 45b to retain nozzle 45 in place. Nut 46 abuts downward facing shoulder 50. Nozzle neck 45b protrudes downward from downward facing shoulder 50 within barrel lower bore portion 48.

Nozzle 45 has a converging orifice passage 47a on its upper end that converges downward at a selected angle relative to axis 33. A cylindrical orifice passage 47b joins the lower end of converging orifice passage 47a and extends at a constant diameter to the lower end of neck 45b. The maximum diameter of converging orifice passage 47a, which is at the upper end of nozzle 45, is the same as the diameter of orifice cavity 31.

A cylindrical barrel 49 has external threads on its upper end that secure to threads in barrel head bore lower portion 48. Barrel 49 extends downward from barrel head 41, which may be considered to be a part of barrel 49. Barrel 49 and barrel head 41 have outer diameters that are less than the inner diameter of housing 39, creating a barrel annulus 51 surrounding barrel 49. Barrel annulus 51 extends upward to the lower ends of discharge passages 37. Barrel 49 has an inner diameter that defines a barrel chamber 53. Barrel chamber 53 has a larger diameter than orifice bore upper and lower portions 43a, 43b. The diameter of barrel chamber 53 is illustrated as slightly less than the diameter of barrel head lower bore portion 48, but that may vary. In this example, the upper end of barrel 49 is spaced a short distance below barrel head downward facing shoulder 50.

As indicated by the solid line arrows, well fluid to be pumped flows down intake ports 35, intake cavity 31, and nozzle orifice passages 47a, b into barrel chamber 53. The flow area through nozzle orifice passages 47a, b is much less than the flow area of intake cavity 31 and also less than the combined flow areas of intake ports 35. The reduction in flow area creates a pressure change and increases the velocity of the well fluid as it flows into barrel chamber 53. The pressure change tends to cause some of the gas that may be entrained in the well fluid to separate and flow back up intake cavity 31 and out intake ports 35, as indicated by the dashed line arrows. The gas flows back out intake ports 35 into the annulus surrounding pump 11, and upward in the well. In this example, as will be explained subsequently, intake ports 35 and intake cavity 31 are always open regardless of whether pump 11 is in a well fluid lifting stroke or an intake stroke.

Figure 1B:
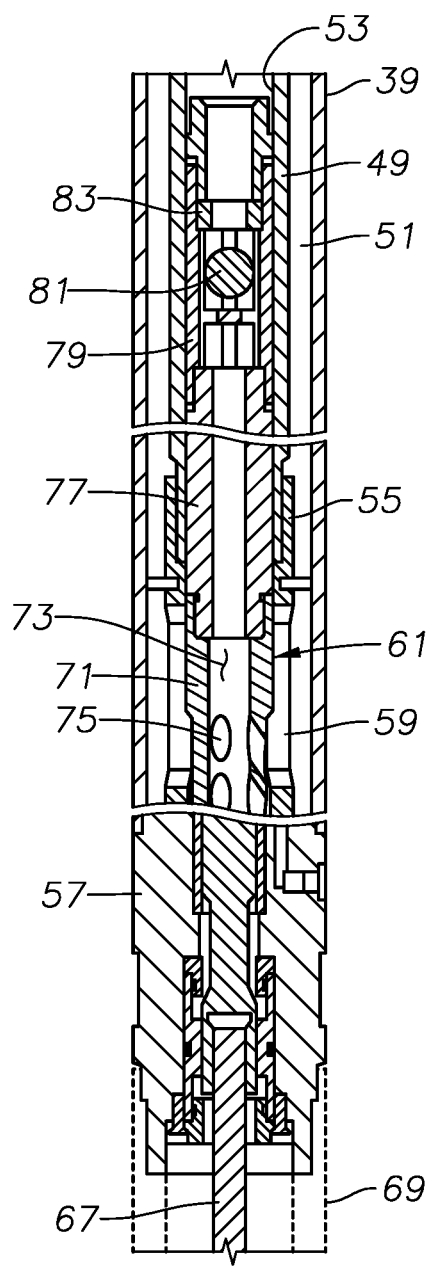

Referring to FIG. 1B, in this example, a tubular barrel adapter 55 secures by threads to the lower end of barrel 49 and may be considered to be a part of barrel 49. Barrel adapter 55 extends downward and secures by threads to a pump base 57. Housing 39 also secures by threads to pump base 57. Barrel adapter 55 has a plurality of barrel ports 59 in its side wall. The inner diameter of barrel adapter 55 defines a lower portion of barrel chamber 53, and barrel ports 59 communicate this lower portion of barrel chamber 53 with barrel annulus 51.

In this embodiment, a fluid moving mechanism comprises a plunger assembly 61, which strokes up and down within barrel chamber 53. FIG. 1B shows plunger assembly 61 in a lower or down stroke position. A connecting rod or motor drive shaft 67 secures to plunger assembly 61. Connecting rod 67 extends upward from a motor 69 that secures to the lower end of pump base 57. Motor 69 may be a linear motor of a type described in published application US 2015/0176574. Alternately, motor 69 could be an electrical motor that has a motion converter to convert rotary motion of its drive shaft to linear motion for connecting rod 67. Also, a pressure equalizer or seal section (not shown) for equalizing motor lubricant pressure with well bore pressure could be connected between motor 69 and pump 11.

Plunger assembly 61 has a middle portion 71 extending upward from a lower portion of plunger assembly 61. Plunger middle portion 71 has an axially extending plunger cavity 73. Plunger ports 75 in the side wall of plunger middle portion 71 communicate well fluid in plunger cavity 73 with barrel annulus 51. The portion of the side wall containing plunger ports 75 is smaller in outer diameter than the portions of plunger assembly 61 directly above and below.

Plunger assembly 61 has an upper plunger portion 77 that is a tubular member with a bore that is an upward continuation of plunger cavity 73. A travelling valve 79 secures to the upper end of upper plunger portion 77 for stroking movement with plunger assembly 61. Travelling valve 79 has a valve element or ball 81 that closes when engaging a seat 83 located above ball 81.

During operation of this embodiment, well fluid will always be present in intake cavity 31, nozzle passage 47, and the upper portion of barrel chamber 53. Assuming that plunger assembly 61 is being moved upward by connecting rod 67 from the position shown in FIG. 1B, travelling valve 79 will be open and standing valve 21 (FIG. 1A) will be closed. Well fluid in barrel chamber 53 flows downward into plunger cavity 73, filling plunger cavity 73. The well fluid entering plunger cavity 73 causes downward flow of well fluid in intake cavity 31, resulting in separation of gas at nozzle 45, as explained above. The gaseous portions of the well fluid migrate back upward and out intake ports 35. During this upstroke, well fluid in plunger cavity 73 is able to flow out plunger ports 75 into barrel chamber 53 below plunger assembly 61.

Typically, when plunger 61 is moving upward, some well fluid is pushed out nozzle 45 and into intake cavity 31. This upward flow causes orifice 43 to develop back pressure in barrel chamber 53. During the upstroke, since there is a restriction of flow created at nozzle 45, additional compression of the well fluid is created between plunger assembly 61 and nozzle 45. This additional compression of the well fluid forces more well fluid through plunger assembly 61 and also aids in forcing some of the gas back into pump intake ports 35.

As plunger assembly 61 is pulled downward by connecting rod 67 from the top of the upstroke, travelling valve 79 closes, and plunger assembly 61 will push well fluid in barrel chamber 53 below plunger assembly 61 downward and out through barrel ports 59 into barrel annulus 51. The force caused by the downward movement of plunger assembly 61 forces well fluid in barrel annulus 51 up through discharge passages 37 and opens standing valve 23 to allow flow up into production tubing 13.

During the down stroke, the closed travelling valve 79 prevents downward flow of well fluid in barrel chamber 53 into plunger cavity 73. However, well fluid entering intake ports 35 will still flow through intake cavity 31 and nozzle orifice passage 47 into barrel chamber 53. Gas separation will thus occur at nozzle 45 both during the upstroke and the down stroke. At or near the bottom of the down stroke, plunger ports 75 will again register with barrel ports 59, communicating plunger cavity 73 with barrel annulus 59. The well fluid in plunger cavity 73 thus flows from plunger cavity 73 and barrel annulus 59 into barrel chamber 53. Travelling valve 79 opens at the bottom of the production stroke. This allows well fluid from intake cavity 31 and barrel chamber 53 to communicate with plunger cavity 73. Then, when plunger assembly 61 moves upward during the fill stroke, the fluid in barrel chamber 53 moves to plunger cavity 73 and barrel annulus 59.

Figure 3:
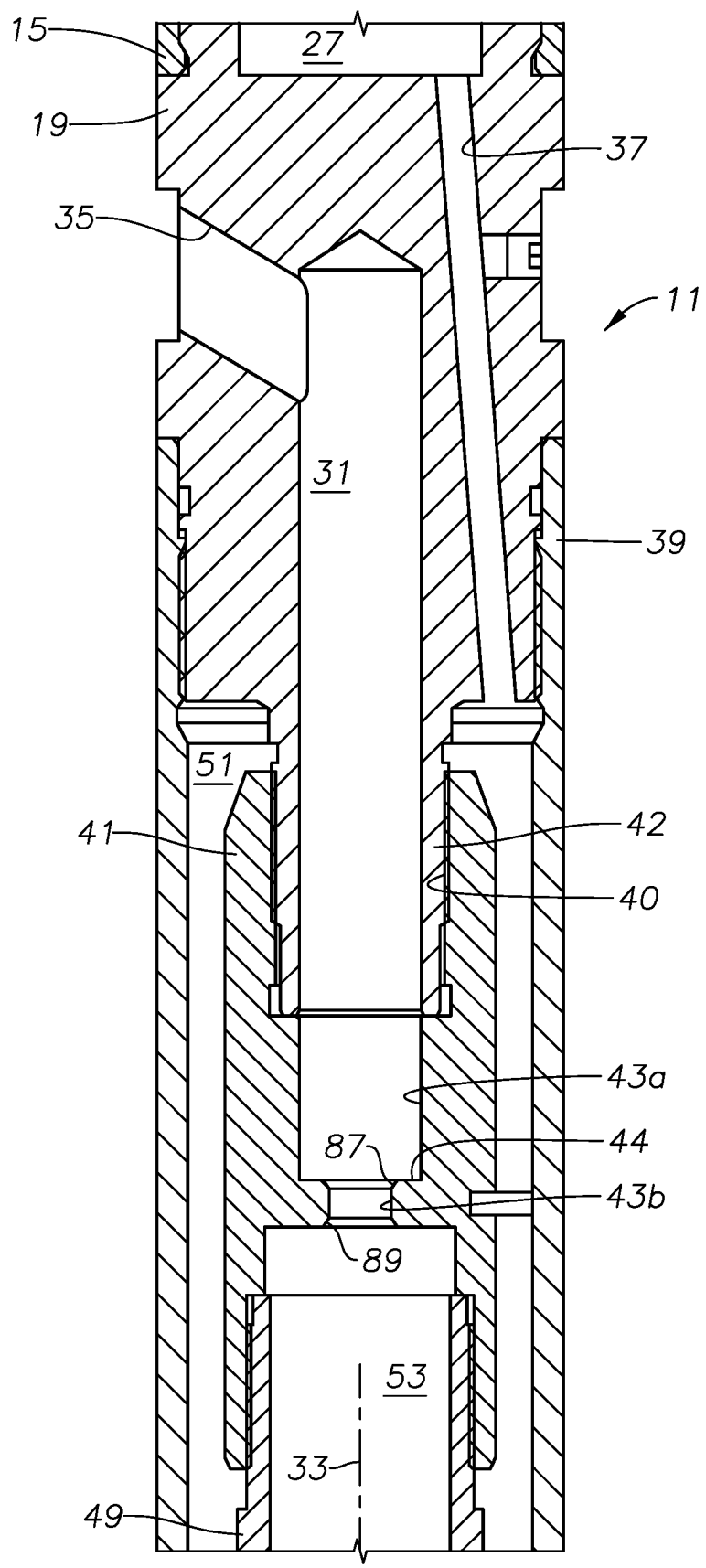
FIG. 3 is an enlarged sectional view of a portion of the pump of FIGS. 1A and 1B, but showing a square edge orifice inlet passage.

In the alternate embodiment of FIG. 3, many of the features are the same as in the first embodiment and will not be mentioned again. Components that are the same and are mentioned have the same numerals as in FIGS. 1 and 2. In FIG. 3, nozzle 45 (FIG. 2) is not used. Orifice 43 has orifice bore portions 43*a* and 43*b* as in the first embodiment. Upward facing shoulder 44 is in a plane perpendicular to axis 33, defining orifice 43 as a square edged orifice. In this example, orifice bore upper portion 43*a* has the same diameter as intake cavity 31. Because of the same diameters of orifice bore upper portion 43*a* and intake cavity 31, upward facing shoulder 44 may be considered to be at the lower end of intake cavity 31. A short downward converging section or upper bevel 87 may be at the junction of bore lower portion 43*b* with shoulder 44. A short downward diverging section or lower bevel 89 may be at the lower end of bore lower portion 43*b*.

Bore lower portion 43*b* creates a pressure change and increases the velocity of the well fluid flowing downward from intake cavity 31, causing a separation of gas at shoulder 44. Bore lower portion 43*b* may create a greater pressure change and greater increase in velocity than the converging nozzle 45 (FIG. 2), to help separate gas from the liquid. However, the restrictive orifice arrangement of FIG. 3 may restrict the overall flow rate of well fluid into the barrel chamber 53 more than converging nozzle 45.

Orifice 43 of the FIG. 3 should be sized, diameter and length, according to the anticipated flow and necessary pressure change through orifice 43. Orifice bore portions 43*a*, 43*b*, as shown in FIG. 3 may be identical to orifice bore portions 43*a*, 43*b* of FIG. 2. Subsequently, if a converging nozzle, such as nozzle 45 (FIG. 1A) is installed in orifice bore portions 43*a*, 43*b*, the size of the converging nozzle passage 47*a*, as well as the diameter and length of nozzle passage 47*b* should be sized according to the anticipated flow and necessary pressure changes.

The present disclosure described herein, therefore, is well adapted to carry out the objects and attain the ends and advantages mentioned, as well as others inherent therein. While two embodiments of the disclosure have been given for purposes of disclosure, numerous changes exist in the details of procedures for accomplishing the desired results. These and other similar modifications will readily suggest themselves to those skilled in the art, and are intended to be encompassed within the scope of the appended claims.

For example, the restrictive intake passage arrangement could be located in other parts of the intake passage. Also, the restrictive intake passage arrangement could be incorporated with other types of pumps, even rotary types. More than one converging nozzle in series, or more than one squared edged orifice, could be used. A separate and replaceable orifice plate could be employed in the restrictive passage in the barrel head.

The invention claimed is:

1. A well pump assembly, comprising:
a pump housing having a longitudinal axis;
an intake member secured to the pump housing;
a discharge member secured to the pump housing and having a discharge passage;
an intake passage in the intake member for drawing well fluid into the pump;
a fluid moving mechanism operatively located between the intake passage and the discharge passage to propel the well fluid out the discharge passage;
an orifice in the intake passage, the orifice having an orifice passage with a downstream direction converging section extending from the intake passage to a constant diameter section, the constant diameter section having a smaller diameter than the intake passage; wherein the orifice comprises:
a nozzle containing the orifice passage and secured within a downstream end of the intake passage; and wherein
the converging section of the orifice passage has an upstream end with a diameter equal to a diameter of the downstream end of the intake passage.

2. The assembly according to claim 1, further comprising:
a downstream direction diverging section joining and extending downward from the constant diameter section of the orifice passage.

3. A well pump assembly, comprising:
a pump housing having a longitudinal axis;
an intake member secured to the pump housing;
a barrel having a barrel head secured to and extending downward from the intake member, the barrel having a barrel bore;
a plunger reciprocally carried in the barrel bore;
an intake passage extending coaxially in the intake member and the barrel head into the barrel bore above the plunger;
an intake port extending from an exterior of the intake member to the intake passage; and an orifice in the intake passage, the orifice having an orifice passage with a downward converging section extending downward to a constant diameter section, the constant diameter section having a smaller diameter than the intake passage.

4. The assembly according to claim 3, wherein the orifice comprises:
a nozzle containing the orifice passage and secured within the intake passage.

5. The assembly according to claim 3, wherein the orifice comprises:
a nozzle containing the orifice passage and secured within a lower end of the intake passage; and wherein
the downward converging section of the orifice passage has a maximum diameter equal to a diameter of the lower end of the intake passage.

6. The assembly according to claim 3, wherein the orifice comprises:
a nozzle containing the orifice passage and secured within a lower end of the intake passage, the nozzle having a nozzle upper portion extending upward into the intake passage, the nozzle having a nozzle lower portion extending downward below the lower end of the intake passage into the barrel bore.

7. The assembly according to claim 3, wherein the orifice comprises:
a nozzle containing the orifice passage and secured within a lower end of the intake passage, the nozzle having a nozzle upper portion and a nozzle lower portion, the nozzle upper portion having a larger outer diameter that is the same as an outer diameter of the intake passage and greater than an outer diameter of the nozzle lower portion;
the nozzle lower portion extending downward below the lower end of the intake passage into the barrel bore; and
the outer diameter of the nozzle lower portion being smaller than a diameter of the barrel bore.

8. The assembly according to claim 3, wherein the orifice comprises:
an annular upward facing shoulder at a lower end of the intake passage;
an orifice bore extending through the upward facing shoulder;
a nozzle containing the orifice passage, the nozzle having a nozzle upper portion and a nozzle lower portion, the nozzle upper portion having a larger outer diameter than an outer diameter of the nozzle lower portion, defining a downward facing shoulder that rests on the upward facing shoulder;
the outer diameter of the nozzle upper portion being the same as the diameter of the intake passage;
the outer diameter of the nozzle lower portion being the same as the diameter of the orifice bore; and
the nozzle lower portion protruding below the orifice bore into the barrel bore.

9. The assembly according to claim 3, further comprising:
a downward diverging lower section joining and extending downward from the constant diameter section of the orifice passage.

10. A well pump assembly, comprising:
a pump housing having a longitudinal axis;
an intake member secured to the pump housing;
a barrel having a barrel head secured to and extending downward from the intake member, the barrel having a barrel bore;
a plunger reciprocally carried in the barrel bore;
an intake passage extending coaxially in the intake member and the barrel head into the barrel bore above the plunger;
an intake port extending from an exterior of the intake member to the intake passage; and
a nozzle secured at a lower end of the intake passage, the nozzle having an orifice passage with a downward converging section extending downward to a constant diameter section, the constant diameter section having a smaller diameter than the intake passage.

11. The assembly according to claim 10, wherein:
the downward converging section of the orifice passage has an upper end with a diameter equal to a diameter of the intake passage.

12. The assembly according to claim 10, wherein:
the nozzle has a nozzle upper portion and a nozzle lower portion extending downward below the lower end of the intake passage into the barrel bore.

13. The assembly according to claim 10, wherein:
the nozzle has a nozzle upper portion and a nozzle lower portion, the nozzle upper portion having an outer diameter that is the same as a diameter of the intake passage and greater than an outer diameter of the nozzle lower portion;
the nozzle lower portion extends downward into the barrel bore; and
the outer diameter of the nozzle lower portion is smaller than a diameter of the barrel bore.

14. The assembly according to claim 10, further comprising:
an annular upward facing shoulder at a lower end of the intake passage;
an orifice bore extending through the upward facing shoulder; wherein
the nozzle has a nozzle upper portion with a larger outer diameter than an outer diameter of a nozzle lower portion, defining a downward facing shoulder that rests on the upward facing shoulder;
the outer diameter of the nozzle upper portion being the same as the diameter of the intake passage;
the outer diameter of the nozzle lower portion being the same as the diameter of the orifice bore; and
the nozzle lower portion protruding below the orifice bore into the barrel bore.

15. The assembly according to claim 14, wherein an outer diameter of the annular upward facing shoulder is the same as a diameter of the intake passage.

* * * * *